March 17, 1953　　A. C. HEEHLER　　2,632,151
FLEXIBLE DRIVE COUPLING FOR A WARNING LIGHT APPARATUS
Filed May 3, 1951　　2 SHEETS—SHEET 1

Inventor
Arthur C. Heehler

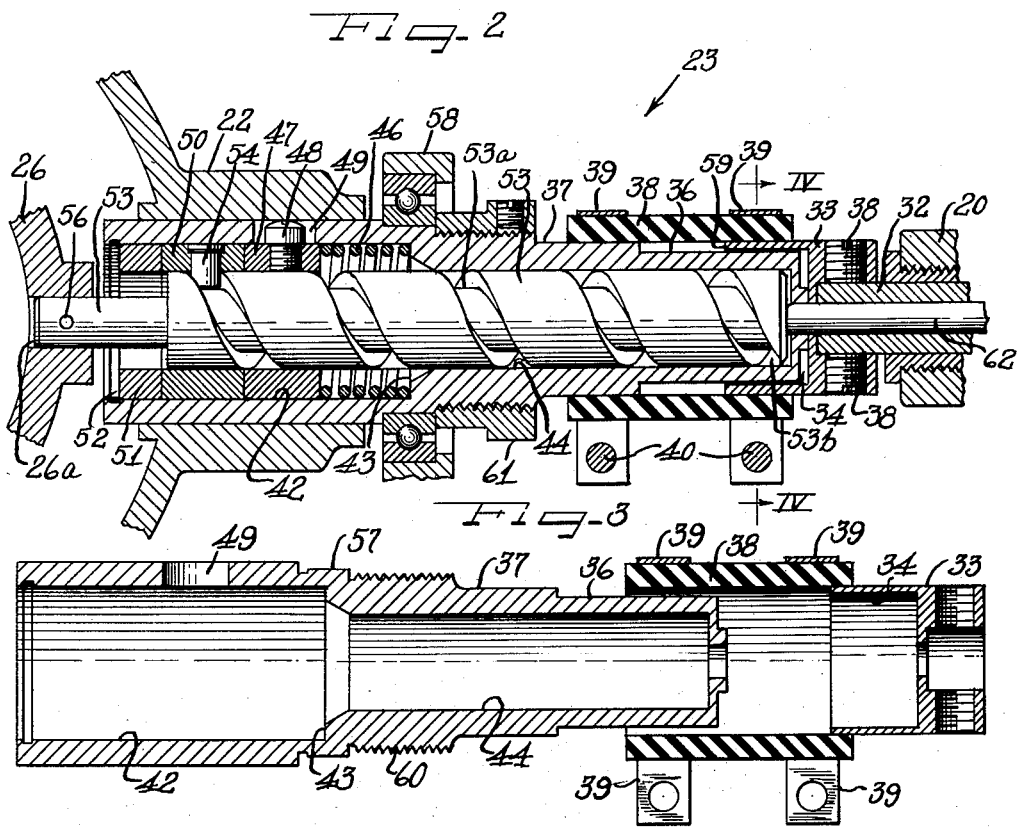
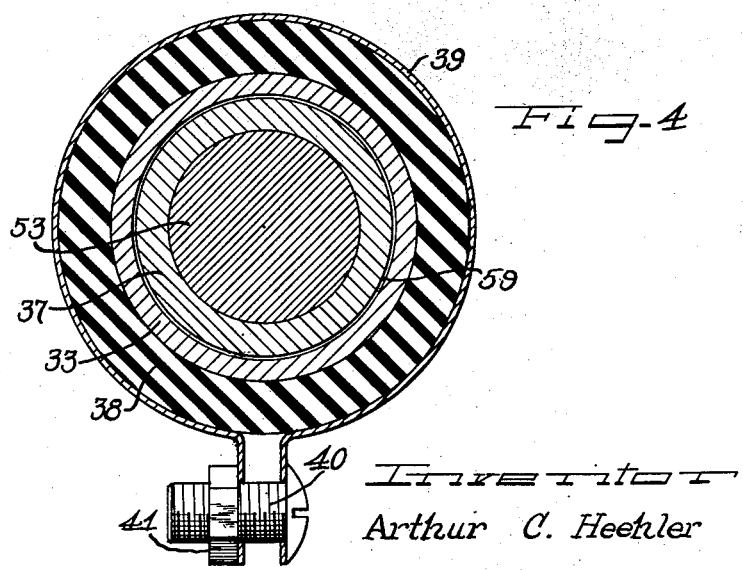
Arthur C. Heehler

Patented Mar. 17, 1953

2,632,151

UNITED STATES PATENT OFFICE 2,632,151

FLEXIBLE DRIVE COUPLING FOR A
WARNING LIGHT APPARATUS

Arthur C. Heehler, Chicago, Ill., assignor to The
Pyle-National Company, Chicago, Ill., a corporation of New Jersey Application May 3, 1951, Serial No. 224,277

10 Claims. (Cl. 340—50)

This invention relates generally to illumination apparatus and more particularly to an improved flexible drive coupling located between a gyrating light source means and a drive motor to accommodate relative axial misalignment and to take up torsion shock between the motor and the light source means.

The subject matter of the present invention constitutes a continuation in part of that disclosed in my copending application Serial No. 74,086, filed February 2, 1949, Patent No. 2,607,839, dated August 19, 1952.

According to the general principles of the present invention, a rotatable light source means is mounted in generally coaxial disposition relative to a driving motor and a drive coupling is provided between the motor and the light source means including a collar rotatably driven by the motor and adapted to receive the end portion of a shaft connected to the light source means. A torsionally yieldable connection is provided between the collar and the shaft to take up torsional shock between the motor and the shaft. The collar and the shaft are also arranged to accommodate relative axial misalignment therebetween.

It is an object of the present invention to provide an improved drive coupling arrangement for a warning light mechanism.

Another object of the present invention is to provide an improved drive coupling for a warning light apparatus whereby axial misalignment may be accommodated between a coaxially aligned light source means and drive motor.

A further object of the present invention is to provide an improved shock absorbing drive coupling between a two directional motor and a gyratable light source means including a color screen mechanism actuated in response to direction of the motor, whereby torsional shock occurring upon changes in direction of rotation of the motor will be adequately accommodated.

Many other features, advantages and additional objects of the present invention will become manifest to those versed in the art upon making reference to the detailed description which follows and the accompanying sheets of drawings in which a preferred structural embodiment incorporating the principles of the present invention is shown.

On the drawings:

Figure 2 is an enlarged cross-sectional fragmentary view of the drive coupling provided in accordance with the principles of the present invention;

Figure 3 is an exploded view showing elements of the drive coupling of Figure 2 in separated alignment to illustrate additional details of construction thereof; and Figure 4 is an enlarged fragmentary cross-sectional view taken on line IV—IV of Figure 2.

As shown on the drawings:

Figure 1:
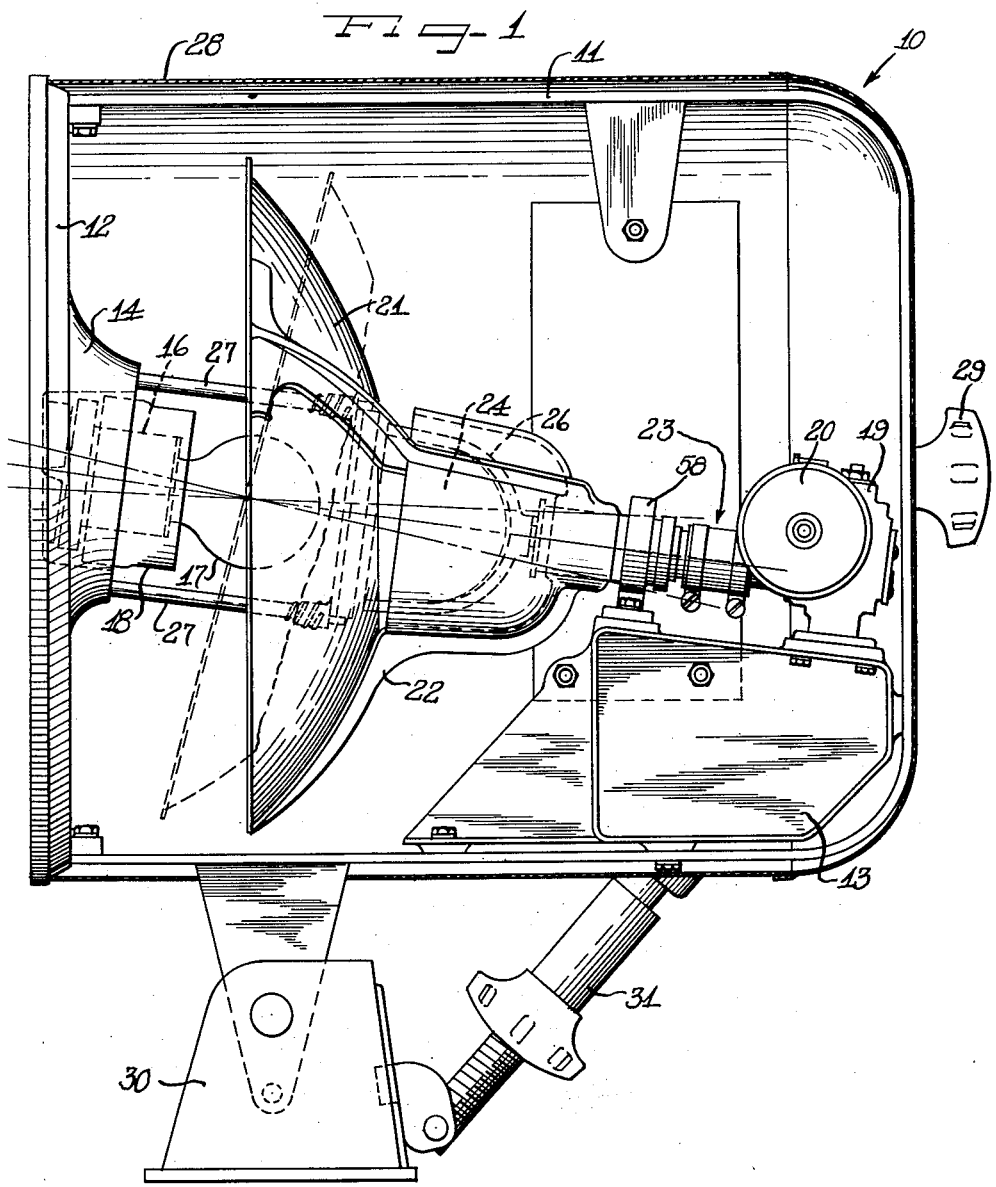
Figure 1 is a cross-sectional view of a warning light apparatus provided in accordance with the principles of the present invention and showing parts in elevation for the sake of clarity.

In Figure 1 an illumination apparatus is indicated generally by the reference numeral 10 and includes a U-shaped frame 11 supporting a front ring 12 and a mounting shoe 13. A stationary light source is carried by the front ring 12, the light source including a front support 14 mounting a socket 16 receiving an incandescent light bulb 17 and surrounded by a shield 18.

The mounting shoe 13 carries a two-directional prime mover taking the form of an electric motor 19 and including a reduction gear box 20.

A reflector apparatus is spaced away from the light source and includes a parabolic reflector 21 carried by the arms of a spider 22 in eccentrically offset relation to an axis of rotation established by a driving connection indicated generally by the reference numeral 23 and located between the spider 22 and the gear box 20 of the prime mover 19. Thus, whenever the reflector 21 is rotated, a wobbling action will be produced. The reflector 21 is preferably arranged to have its optic axis pass substantially through the bulb 17 and is so situated as to have the filament of the bulb 17 located at the focal center of the reflector 21.

In order to selectively color the beam of light projected by the reflector 21 in a moving pattern past the light bulb 17, a color screen unit is provided which is moved through an aperture formed in the reflector 21 along a reciprocable path in response to the direction of rotation of the prime mover 19. The color screen mechanism includes a color filter 24 mounted in a holder 26 guided for reciprocation by a pair of guide rods 27 projecting inwardly from the front support 14. When the color filter 24 is moved forwardly, the light bulb 17 is surrounded and the light of emission therefrom is intercepted by the color filter 24 so that a colored beam of light will be projected. It will be understood that the shield 18 together with the front support 14 comprises a light shielding means to preclude the introduction of natural rays of light into the colored beam when the color filter 24 is positioned forwardly in surrounding relationship relative to a light bulb 17

The illumination apparatus 10 is enclosed by a casing 28 retained in place on the frame 11 by means of a hand knob 29. The entire casing structure including the frame 11 is pivotally supported on a bracket 30 and may be adjustably positioned through the use of a position adjustment locking device indicated generally by reference numeral 31.

Referring now more particularly to Figures 2, 3 and 4 in connection with Figure 1, the details of construction of the novel drive coupling, provided in accordance with the principles of the present invention will now be described.

A power take-off shaft 32 projects from the gear box 20 of the prime mover 19 and rotatably drives a collar 33 having a recess 34 formed in one end thereof and adapted to receive a reduced diameter end 36 of a hollow shaft 37. A pair of set screws 38, 38 are carried by the collar 33 and may be turned inwardly from opposite directions to clamp the collar 33 in firm assembly with the power take-off shaft 32.

The hollow shaft 37 rotatably drives the spider 22 and is coupled for co-rotation with the collar 33 by means of a flexible sleeve 38 made of a resilient, elastic material such as rubber or the like. The sleeve 38 is locked to the hollow shaft 37 and to the collar 33 by means of a pair of strap clamps 39, 39 radially collapsible in the usual manner by tightening a screw 40 and a nut 41.

The hollow shaft 37 is substantially a cylindrical member having an enlarged diameter portion at one end and includes a bore 42 terminating in a shoulder 43, a reduced diameter bore 44 extending inwardly from the shoulder 43. Seated within the bore 42 and against the shoulder 43 is a coiled spring 46 which is preferably selected to exert a spring bias of predetermined quantitative value.

Positioned adjacent the spring 46 and in abutting assembly therewith is a friction pressure ring 47. The ring 47 is annular in shape and is adapted to receive in threaded relationship therewith a stop screw 48, the head of which may project upwardly into a longitudinal slot 49 formed in the hollow shaft 37.

It will be evident that the friction pressure ring 47 operates to confine the spring 46 within the limits prescribed by the longitudinal dimension of the slot 49 and the ring 47 will be reciprocable within the bore 42 whenever a longitudinal thrust is exerted upon the ring 47 in sufficient quantity to overcome the bias of the spring 46.

A friction spinner member 50 of substantially annular configuration is positioned adjacent the ring 47 and within the bore 42. The end of the bore 42 is closed by a ring 51 retained in firm assembly with the hollow shaft 37 by means of a snap ring 52 received in an appropriate annular recess formed in the end of the bore 42.

A screw member 53 is disposed within the reduced diameter bore 44 of the hollow shaft 37. It will be noted that the diameter of the bore 44 is such as to support the screw 53, together with the friction pressure ring 47 and the friction spinner member 50 in correct radial alignment within the bore 42. A deep thread, indicated by the reference numeral 53a, is cut upon the peripheral surface of the screw 53 and is preferably terminated at both ends of the screw 53 as at 53b. It will be understood, of course, that if continuously threaded screw stock is cut into lengths to form a plurality of screw members 53, the thread portions 53a may be terminated by means of welding a lock plug into the ends of the open threads or some other convenient means.

The friction spinner member 50 is provided with a thread following pin 54 which is normally seated in the thread portion 53a. Using the plane of reference shown on the drawings, it will be apparent that if the shaft 37 is driven counter-clockwise, the thread following pin 54 will be in the position shown in Figure 2, and the shaft 37 will rotate freely while the screw 53 remains stationary.

However, if the shaft 37 is caused to rotate clockwise, a spring bias of predetermined strength exerted by the spring 46 will result in a thrust being imparted to the pressure ring 47 along a longitudinal axis of the shaft and will thereby urge the ring 47 into frictional engagement with the friction spinner 50. The friction spinner 50, in turn, will be thrust into frictional contact with the ring 51. In as much as the spring bias exerted by the spring 46 is of a quantitative strength greater than opposition offered to the thread follower pin 54 by the screw 53, the friction spinner 50 will remain stationary with respect to its relationship to the ring 51 and the tubular hollow shaft 37 and will therefore follow the helical path defined by the thread 53a of the screw 53.

The end result is that a longitudinal thrust is imparted to the screw 53 by means of the bearing engagement of the thread follower pin 54 against the side walls of the threaded portion 53a, and the entire screw 53 will move leftwardly until the thread follower pin 54 engages the stop portion 53b of the screw 53.

The screw 53 is provided with a reduced diameter portion which passes through the ring 51 and is seated within a bore 26a of the filter holder 26, the filter holder 26 being locked for common axial movement with the screw 53 by means of a pin 56. Thus, whenever the screw 53 is actuated on a longitudinal path in response to a change in direction of the rotation of the hollow shaft 37, the filter holder 26 will be reciprocated in unison therewith and will move the color filter 24 through the aperture formed in the reflector 21 and along the path prescribed by the guide rods 27 to the forward position wherein the light bulb 17 will have the light of emission thereof intercepted so that a color beam of light will be reflected.

Referring further to the drawings, it will be noted that the hollow shaft 37 is provided with an annular portion 57 to support the inner race of a bearing assembly 58 mounted on the shoe 13. It will be understood that the prime mover 19 is further provided with appropriate bearings means so that the coaxial disposition of the reflector and the prime mover and the drive coupling 23 requires a relatively close alignment between spaced apart bearing points supporting the various components of the drive mechanism. To accommodate misalignment between the rotatable reflector means and the prime mover, the reduced diameter portion 36 of the hollow shaft 37 and the recess 34 provided in the collar 33 are constructed to exhibit a predetermined clearance indicated generally by the reference numeral 59. The clearance 59 together with the flexible connection between the hollow shaft 37 and the collar 33 afforded by the flexible sleeve 38 adequately accommodates any misalignment occurring between spaced apart bearing centers, thereby contributing to the efficient operation of the drive coupling 23.

The flexible sleeve further operates to fully absorb torsional shock occurring when the two-directional prime mover 19 is selectively reversed in order to actuate the color screening mechanism in positioning the color filter 24 forwardly of the reflector 21.

It may be noted that the hollow shaft 37 is provided with a threaded portion 60 adjacent the bearing 58 to receive in threaded assembly a retaining ring 61 holding the bearing assembly 58 against longitudinal displacement. The power take-off shaft 32 and the hollow shaft 37 are also provided with suitable apertures for receiving a snap switch impeller 62 arranged to engagingly abut the end of the screw 53 and adapted to actuate a snap switch used in controlling the operation of the light.

Although various structural modifications might be suggested by those versed in the art it should be understood that I wish to embody within the scope of this patent all such modifications as reasonably and properly come within the scope of my contribution to the art.

I claim as my invention:

1. Illumination apparatus comprising, in combination, a frame, a bulb receptacle mounted on one end of said frame and extending inwardly thereof, a pair of rods secured to said frame in spaced alignment with said receptacle and extending inwardly in said frame in parallel relation with one another, a bulb in said receptacle, a parabolic reflector in spaced relation to said bulb for reflecting a beam of light outwardly past said bulb, said reflector defining an axially disposed aperture, a spider firmly assembled with said reflector and having a tubular shaft connected therewith, a bearing means on said frame for supporting said shaft, motor means on said frame, a driving connection between said motor means and said shaft, said driving connection including a resilient member to absorb torsional shock between said motor means and said shaft, an annular pressure ring fixed in said tubular shaft adapted for limited longitudinal reciprocation therein, an annular friction spinner in said tubular shaft adjacent said pressure ring, spring means in said tubular shaft for spring biasing said ring toward said spinner, a screw engageable with said friction spinner and radially supported by said pressure ring in said tubular shaft, a globe retainer frame slidingly carried by said rods and reciprocatingly actuatable by said screw, and a colored filter in said retainer frame, whereby when said reflector is rotated in one direction a gyrating beam of white light is produced, and when rotated in the opposite direction said colored filter is reciprocated forwardly to surround said bulb thereby producing a colored gyrating beam of light.

2. Illumination apparatus comprising, in combination, a frame, a bulb receptacle mounted on one end of said frame and extending inwardly thereof, a bulb in said receptacle, a parabolic reflector in spaced relation to said bulb for reflecting a beam of light outwardly past said bulb, said reflector defining an axially disposed aperture, a color filter movable through said aperture to surround said light bulb, a spider supporting said reflector in eccentrically offset position whereby rotation thereof will produce a gyrating beam of light, a tubular shaft to drive said reflector, bearing means on said frame for supporting said shaft, motor means on said frame, a driving connection between said motor means and said tubular shaft, said driving connection including a collar rotatably driven by said shaft and having a recess to receive the end of said shaft, said driving connection further including yieldable means coupling said collar to said shaft, thereby to accommodate misalignment along the axis of said shaft, an annular pressure ring fixed on said tubular shaft adapted for limited longitudinal reciprocation therein, an annular friction spinner in said tubular shaft adjacent said pressure ring, spring means in said tubular shaft for spring biasing said ring toward said spinner, a screw engageable with said friction spinner and radially supported by said pressure ring in said tubular shaft, said screw arranged to reciprocatingly actuate said color filter, whereby when said reflector is rotated in one direction a gyrating beam of white light is produced, and when rotated in the opposite direction said color filter is reciprocated forwardly to surround said bulb thereby producing a color gyrating beam of light.

3. Illumination apparatus comprising, in combination, a light source, a bowl-shaped reflector defining an axially disposed aperture and being in spaced relation with said light source, a cup-shaped housing firmly assembled with said reflector and adapted to come in registry with said aperture, a tubular shaft locked to said housing, a two-directional driving means, a driving connection between said two-directional driving means and said shaft including a yieldable coupling to absorb torsional shock, screw means reciprocable on said tubular shaft and through said housing, a globe support connected to said screw means, and a globe in said support, said globe and said support normally received by said cup-shaped housing, said screw means operable upon actuation of said driving means in a reverse direction to reciprocate said globe through said aperture of said reflector into surrounding relationship with said light source.

4. Illumination apparatus comprising, in combination, a light source, a bowl-shaped reflector defining an axially disposed aperture and being in spaced relation with said light source, a cup-shaped housing firmly assembled with said reflector and adapted to come in registry with said aperture, a tubular shaft locked to said housing, a two-directional driving means, a driving connection between said two-directional driving means and said shaft including a collar rotatably driven by said driving means, said collar having a recess to receive the end of said shaft and yieldable coupling means between said collar and said shaft, thereby to accommodate axial misalignment between said driving means and said shaft, screw means reciprocable on said tubular shaft and through said housing, a globe support connected to said screw means, and a globe in said support, said globe and said support normally received by said cup-shaped housing, said screw means operable upon actuation of said driving means in a reverse direction to reciprocate said globe through said aperture of said reflector into surrounding relationship with said light source.

5. In illumination apparatus, the improvement comprising, in combination, a reflector defining a centrally disposed aperture, a selectively operable two-directional driving means, a driven connection between said driving means and said reflector, said connection comprising a substantially cylindrical tube defining a longitudinal bore, a screw reciprocable in said bore of said connection, a friction spinner defining a tooth for engaging said screw, an annular friction pressure ring loosely mounted in said bore, spring means in said bore adapted to spring bias said friction pressure ring toward said friction spinner whereby said screw may be reciprocated back and forth in said bore in response to a change in rotational direction of said driving means and globe means connected to said screw, said globe means adapted to reciprocate through said aperture of said reflector, said connection further including a torsionally yieldable coupling member between said driving means and said reflector to take up torsional shock therebetween.

6. In illumination apparatus, the improvement comprising, in combination, a reflector defining a centrally disposed aperture, a selectively operable two-directional driving means, a driven connection between said driving means and said reflector, said connection comprising a substantially cylindrical tube defining a longitudinal bore, a screw reciprocable in said bore of said connection, a friction spinner defining a tooth for engaging said screw, an annular friction pressure ring loosely mounted in said bore, spring means in said bore adapted to spring bias said friction pressure ring toward said friction spinner whereby said screw may be reciprocated back and forth in said bore in response to a change in rotational direction of said driving means and globe means connected to said screw, said globe means adapted to reciprocate through said aperture of said reflector, said connection further including a torsionally yieldable coupling including a collar rotatably driven by said driving means and adapted to receive said tube and a flexible sleeve connecting said collar and said tube for co-rotation, said sleeve adapted to absorb torsional shock between said driving means and said reflector, said collar and said tube arranged to accommodate relative axial misalignment.

7. In a warning light apparatus, a rotatable light source means having a drive shaft extending therefrom, a rotatable driving means in coaxial disposition with said drive shaft, and a coupling between said rotatable driving means and said drive shaft, comprising a collar rotatably driven by said rotatable driving means and adapted to receive the end of said shaft, and a yieldable connection between said collar and said shaft to take up torsional shock between said shaft and said rotatable driving means.

8. In a warning light apparatus, a light source means mounted to project a beam of light in a moving pattern, rotatable driving means for gyrating said light source means including a driving connection between said light source means and said rotatable driving means having a torsionally yieldable shock-absorbing coupling to take up torsional shock between said light source means and said rotatable driving means.

9. In a warning light apparatus, a light source means to project a beam of light in a moving pattern, rotatable driving means for rotating the light source means including a connection between said light source means and said rotatable driving means having a shock-absorbing coupling to take up torsional shock upon change of direction of rotation of said rotatable driving means, a color screen to change the color of the beam of light, and color screen actuating means to move said color screen into beam screening position in response to rotational direction of said rotatable driving means.

10. In a warning light apparatus, a stationary light source, a rotatable reflector spaced from said light source and eccentrically offset to reflect a beam of light past said light source in a moving pattern, driving means for rotating said reflector including a two-directional driver and a connection between said driver and said reflector having a yieldable shock absorber to take up torsional shock when the direction of rotation of said driver is changed, and a color screen mechanism having a rotation responsive actuating means to selectively change the color of the beam of light in response to the rotation of the driver in selected direction.

ARTHUR C. HEEHLER.

REFERENCES CITED

The following references are of record in the file of this patent:

UNITED STATES PATENTS

| Number | Name | Date |
| --- | --- | --- |
| 961,114 | Forster | June 14, 1910 |
| 2,409,046 | Kennelly | Oct. 8, 1946 |
| 2,446,333 | Kennelly | Aug. 3, 1948 |
| 2,464,318 | Kennelly | Mar. 15, 1949 |